Aug. 1, 1961

C. A. WINSLOW 2,994,403

LUBRICANT PURIFYING UNIT

Filed April 21, 1958

INVENTOR.
CHARLES A. WINSLOW
BY *A. Donham Owen*
ATTORNEY.

Aug. 1, 1961

C. A. WINSLOW 2,994,403

LUBRICANT PURIFYING UNIT

Filed April 21, 1958

INVENTOR.
CHARLES A. WINSLOW
BY A. Dunham Owen
ATTORNEY

Fig. 7.

INVENTOR.
CHARLES A. WINSLOW
ATTORNEY.

Aug. 1, 1961

C. A. WINSLOW 2,994,403

LUBRICANT PURIFYING UNIT

Filed April 21, 1958

INVENTOR.
CHARLES A. WINSLOW

BY

ATTORNEY

United States Patent Office 2,994,403
Patented Aug. 1, 1961

2,994,403
LUBRICANT PURIFYING UNIT
Charles A. Winslow, 5640 Castle Drive, Oakland, Calif.
Filed Apr. 21, 1958, Ser. No. 731,573
17 Claims. (Cl. 183—2.5)

This invention relates to improvements in lubricant purifying systems of the type employing filters in combination with de-aerating means. It is an improvement over the inventions described and claimed in Patents Nos. 2,811,218 and 2,811,220. This application is a continuation-in-part of application Serial Number 693,649, filed October 31, 1957, now abandoned.

Many conventional engines, including airplane engines, use what is commonly called a dry sump lubricating system. In normal operation oil is drawn from a primary lubricating oil storage tank and forced by a lubricant pump from the primary tank to the engine bearings. After use it falls to the bottom of the engine sump. It is then picked up by a commonly-called scavenger pump or pumps and forced through coolers and filters and back to the primary oil tank. The capacity of the scavenger pump or pumps is normally greater than the capacity of the primary pressure lubricant pump; therefore air is drawn in along with the oil into the suction of the scavenger pump, and oil foaming develops. This foam problem is particularly bad in aircraft when the plane is flying at high altitudes or under other conditions of reduced pressure. The presence of foam in the oil prevents effective filtration of the dirty oil and also interferes with the proper circulation of oil to the engine. In some cases oil tanks have eventually filled with foamed oil, air, sludge, etc., to the point of causing engine failures from faulty lubrication, primarily due to the fact that highly stressed bearings were provided with dirty foam rather than clean solid oil.

In addition, the air content of the foamed oil prevents efficient use of heat exchangers for warming and cooling the oil. As a result, engine warmup has been substantially prolonged, and effective cooling of the oil at operating power ranges has been prevented.

The general problem of separating the air out of the foamed oil was solved by the inventions claimed in the above-mentioned Patents Nos. 2,811,218 and 2,811,220. There, the oil is introduced into a vortex inside a lubricant purifier housing. In the vortex, the air is separated from the oil and flows up and out a restricted opening or openings. The restriction of the opening causes sufficient air pressure to build up to force the de-aerated oil down through full-flow filter units, whence cleaned, filtered, and de-aerated oil is returned to the primary oil tank. Meanwhile, the air leaving the restricted opening or openings is conducted into the space above the oil in the primary oil tank.

The present invention utilizes this same general system but gives improved results by a novel and ingenious vortex chamber of disc shape. It also solves the problem of assuring proper servicing of the filters by providing a readily removable cartridge assembly within a lubricant system housing that may be permanently installed in a primary oil tank. There is also a novel construction of the air separation portion of the device and a novel channeling of the air and the oil through their respective passages.

One object of the invention is to provide a filter that can be installed within a conventional type of oil tank with the fittings required held to a minimum.

Another object of the invention is to provide a lubricant purifier unit including cooperating de-aeration and full-flow filtration means wherein the entire unit can be serviced from the top.

Another object of the invention is to provide a lubricant purifying system wherein a top housing portion is secured permanently in place in the lubricating tank and wherein the oil filters are withdrawable and replaceable without having to remove the housing. A very simple and expeditious access is provided.

Another object of the invention is to provide a lubricant purifying system whose housing has a small portion that projects from the top of the normal oil inlet to the tank but still routes the separated air into the oil tank.

Another object of the invention is to provide within the air-and-oil-separating portion of the lubricant system a novel baffle means resulting in a disc-shaped vortex chamber that gives improved and more positive air and oil separation.

Another object of the invention is to provide a lubricant-purifying system having a bypass leading directly into the oil tank from the system's inlet without passing through the filter housing at all in the event that the filter elements become plugged to the extent that they will not pass the required quantity of oil.

Another important object of the invention is the elimination of all outside oil and air vent lines to and from the filter unit except the single inlet line which is permanently attached to the unit and not disturbed for filter service.

Another important object of the invention is the provision of a full-flow filtering and de-aerating unit that can be completely serviced by removing a single clamp and cover plate.

Other objects and advantages of the invention will appear from the following description of a preferred embodiment thereof.

The unitary lubricant purifying system or unit 10, as shown in FIGS. 1-6, receives foamed, dirty oil at an inlet 11 and discharges clean oil from the bottom of vertical outlets 12 into an oil tank 13 below the level of the oil in the tank 13. The system 10 also discharges the air that is separated from the deaerated oil by air outlets 14 into an air space 15 in the tank 13, which may be within a cap portion 16 thereof, so that substantially all the air is forced into the tank 13 above the oil, where it will not be mixed with it but will retain the proper air pressure balance within the tank 13 and will not carry any minute oil particles elsewhere. The tank 13 is normally vented to the atmosphere through vents not shown.

The unit 10 comprises a generally cylindrical main casting or housing 20 which supports all the other components directly or indirectly. Preferably, this housing 20 is designed to fit the particular size and design of oil tank 13 with which the system 10 is to be used. In the form shown in the drawings the tank cap 16 has a horizontally extending annular flange 17; so the casting 20 is provided with an annular cylindrical bottom flange 21 to rest on the flange 17 and to be secured thereto by a series of machine screws 22 which are inserted from the bottom prior to the assembly of the other components into the housing 20. Once the housing member 20 is secured in place, it need not be removed for it is a feature of this invention that the filter cartridges and all other elements can easily be removed from the system 10 and new ones inserted in their place without having to take the housing 20 off the flange 17 or to disconnect any pipes whatsoever.

Figure 1:
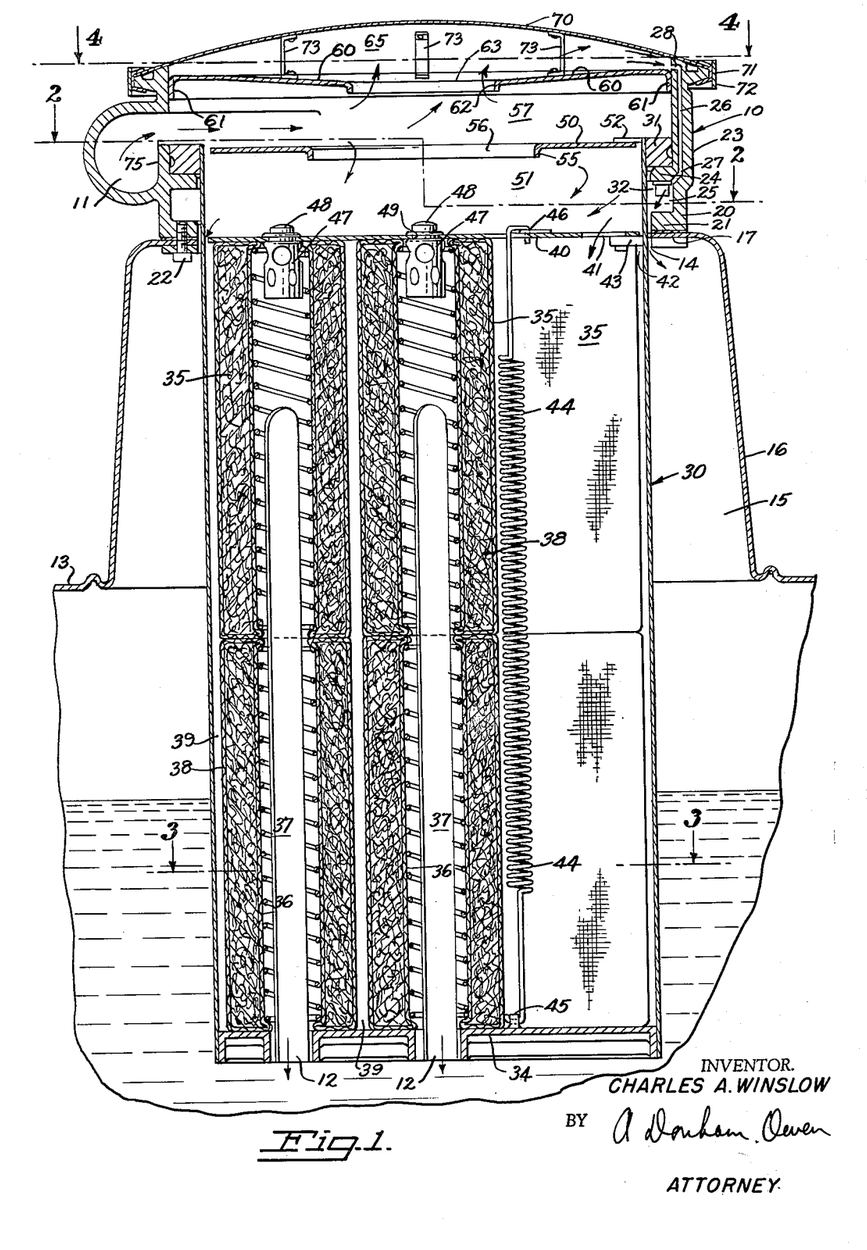
FIG. 1 is a view in elevation and in section of a lubricant purifying system embodying the principles of the present invention and shown installed in an aircraft wing-type oil tank, only the upper portion of the oil tank being shown. The section through the system may be considered as taken along the line 1—1 in FIG. 2.
Figure 2:
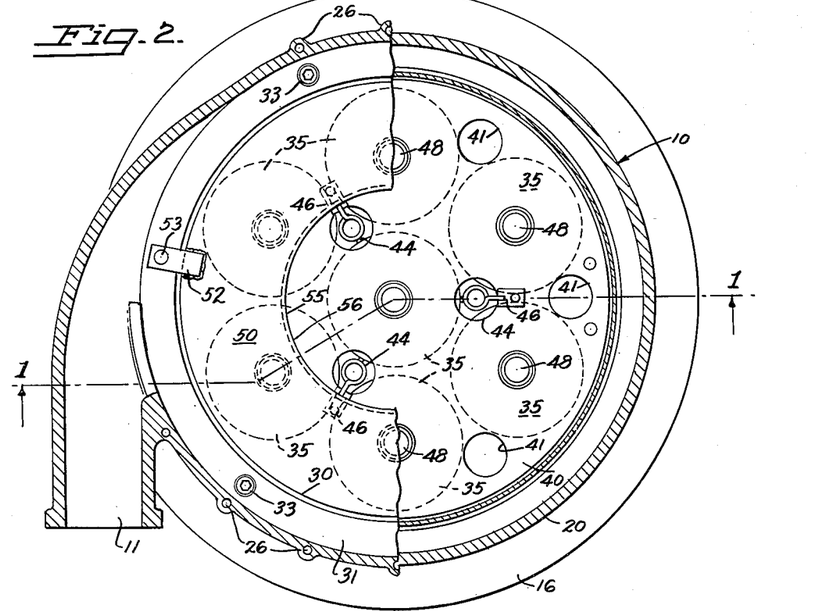
FIG. 2 is a view in horizontal section taken along the line 2—2 of FIG. 1.
Figure 3:
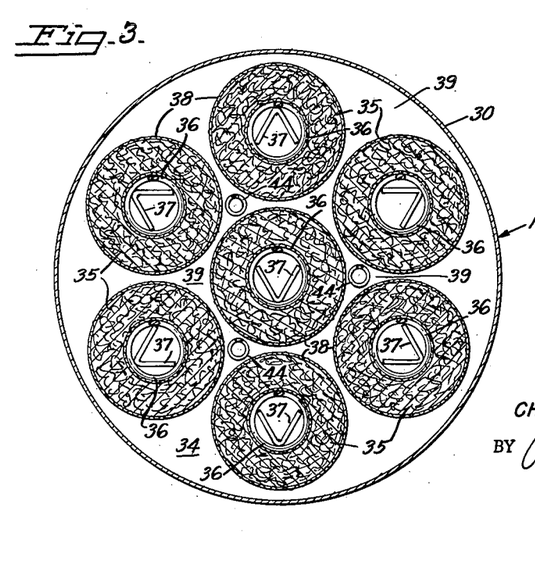
FIG. 3 is a view in horizontal section taken along the line 3—3 in FIG. 1.
Figure 4:
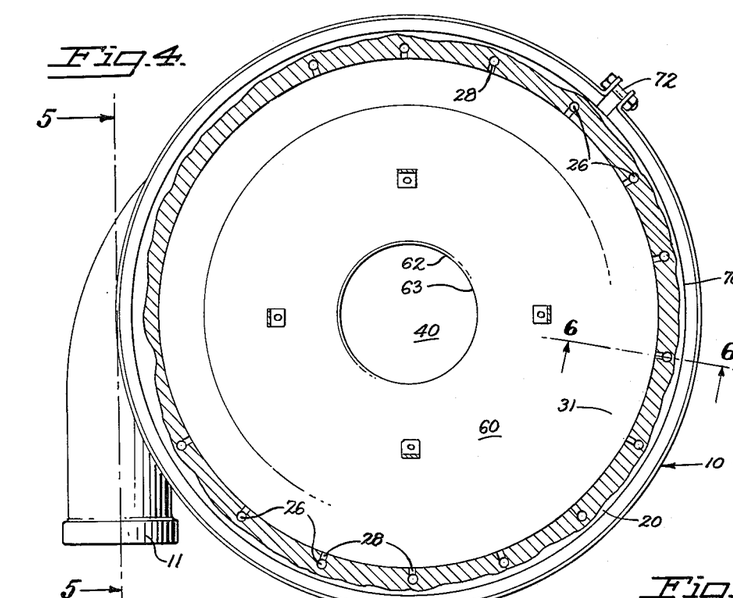
FIG. 4 is a view in horizontal section taken along the line 4—4 of FIG. 1.
Figures 5, 6:
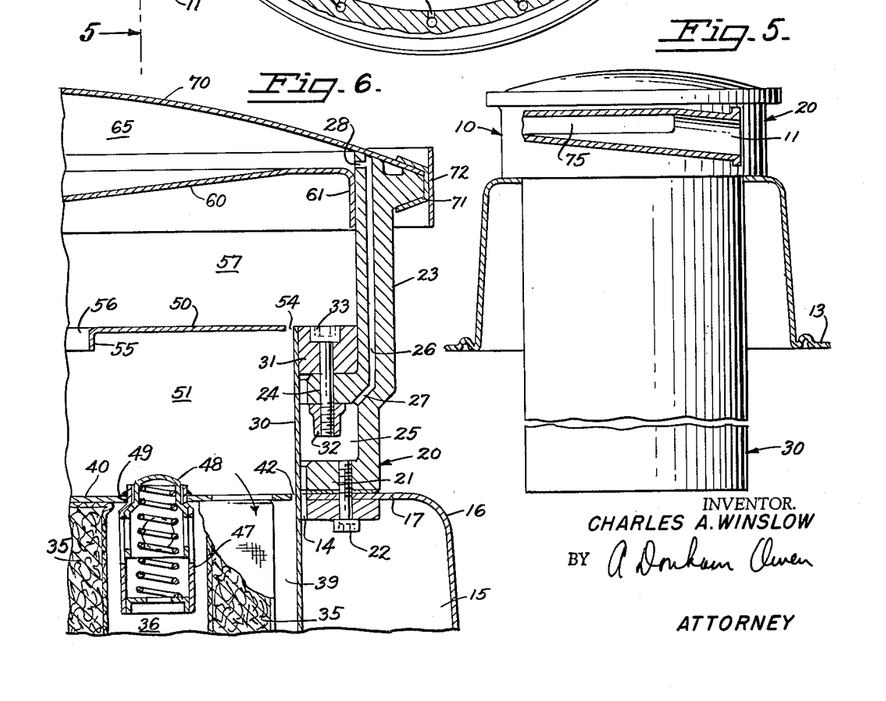
FIG. 5 is a reduced view in elevation and partly in section along the line 5—5 in FIG. 4, the oil tank being taken in section along its centerline.
FIG. 6 is an enlarged fragmentary view in section of a portion of the device taken along the line 6—6 in FIG. 4.
Figure 7:
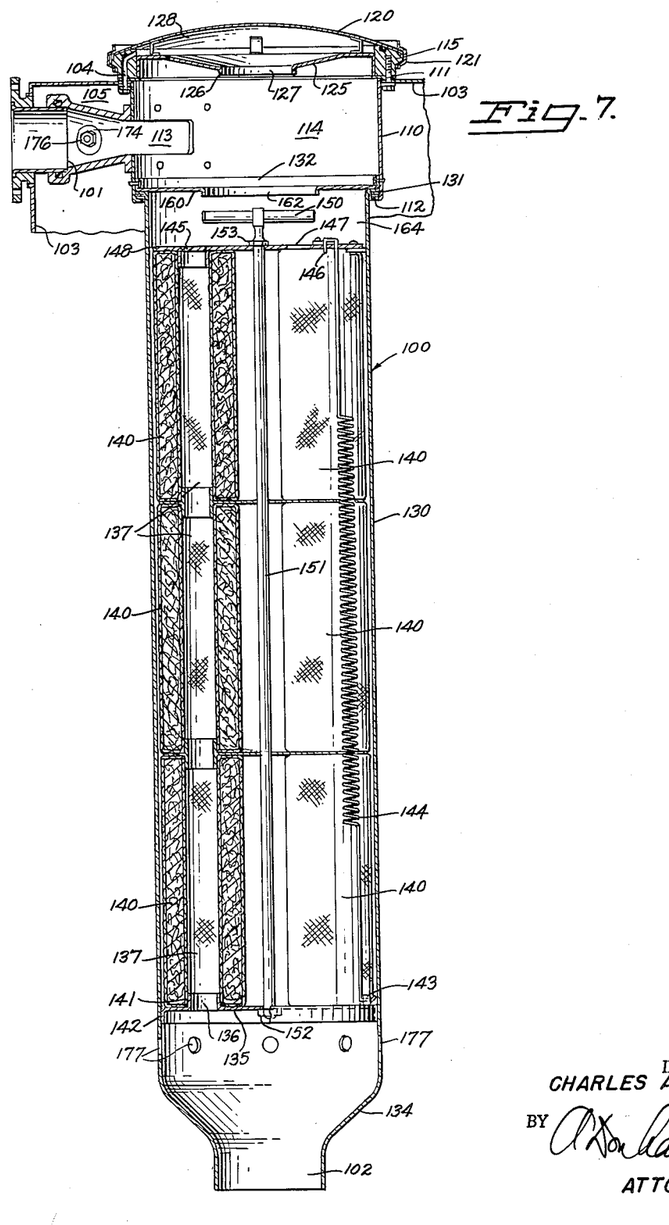
FIG. 7 is a view in elevation and in section of a modified form of the invention.

The housing 20 has a generally cylindrical side wall 23 of substantial thickness shaped to provide the inlet 11 and to route the foamed and dirty oil in on a substantially horizontal plane (see FIG. 5). The housing 20 is also provided with a preferably integral, radially inwardly extending ring 24 spaced above the bottom flange 21 to provide a small chamber 25 therebetween whose outer periphery is bounded by the wall 23. The flange 24 lies below the level of the incoming oil. The housing 20 is bored to provide a series of vertical air passages 26 leading via short angularly extending air passages 27 into the chamber 25. The vertical passages 26 are intersected near their upper ends by short horizontal air vent passages 28 of a restricted size. For example, the passages 28 may be made by a #48 drill (.076"), while the passages 26 and 27 may be made by ⅛" drills. The restricted vents 28 limit the passage of the air which has been separated from the oil and help provide a back pressure of oil in the upper part of the unit 10 sufficient to help force the de-aerated oil down through the filter elements 35. The passages 28 are also so small that any oil which may reach them will not freely pass through them, thus increasing the pressure in the spaces 57 and 65; the pressure increase forces more oil down through the filter elements 35. Thus there is a force always tending to maintain a normal oil level in the unit 10, regardless of varying air and oil ratios.

The ring 24 supports a cylindrical filter casing 30 by means of a cast ring 31 that may be riveted around the outside of the casing's upper end. To secure a tight fit, plate nuts 32 may be riveted to the lower surface of the ring 24, and bolts (such as Allen-head screws 33) clamp the rings 24 and 31 together. When the screws 33 are removed, the casing 30 and its contents may easily be lifted off the ring 24, and may as easily be replaced therein in an oil-tight fit. The housing 30 is spaced radially inwardly from the flange 21 to provide the air outlet 14 leading from the annular chamber 25 into the air space 15 of the oil tank 13. In other words, air which enters the vent 28 passes through the passages 26 and 27 into the chamber 25, and from there through the outlet 14 into the air space 15.

A hollow cast (or otherwise fabricated) bottom plate 34 is riveted or otherwise secured to the lower end of the casing 30. The bottom plate 34 is imperforate except for the outlet openings 12 which extend therethrough. On this plate 34 and in snug engagement therewith, rest a series of annular cylindrical filter cartridges 35 whose central openings or passages 36 lead directly to the outlets 12. To properly locate the cartridges 35 in the casing 30 and hold them in place so that they will not shift laterally, a series of upstanding V-shaped metal strips may be tack-welded to the outlets 12 of the plate 34, and the cartridge openings 36 fit around them. The outer peripheries 38 of the cartridges 35 are spaced apart from each other to provide oil passages 39 around and between the cartridges 35. These passages 39 are closed at their lower end by the plate 34, so that oil can reach the outlets 12 only by passing through the filter cartridges 35. The cartridges 35 may be like those described in Patent No. 2,559,267, to give full-flow, as explained therein.

The upper ends of the cartridges 35 are compressed by and the upper ends of the passages 36 are closed by a closure plate 40. This plate 40 is provided with perforations 41 communicating with the passages 39 between the respective cartridges 35. Further passage for oil is provided by clearance 42 between the casing 30 and the outer periphery of the plate 40. This is provided by securing the plate 40 to the casing 30 by a few radially extending spacers 43 extending outwardly into sliding contact with the casing 30. (If only one cartridge 35 were used, the passage 39 would simply be the peripheral clearance around that cartridge and the same principles would still apply.)

To insure tight closure of the ends of the cartridges 35, coil springs 44 under tension may have one end hooked to a bracket 45 on the bottom plate 34 and the other end hooked to an opening 46 in the closure plate 40. This not only insures that both ends of the filter cartridges 35 will be tightly closed, but also, where, as shown in the drawings, there is more than one cartridge in each column, the cartridges 35 in the column are urged together tightly so that no oil can normally bypass them.

However, should the oil become dirty to the extent of plugging the cartridges 35, so that they will no longer pass the proper amount of oil, it is essential that there be some bypassing. Normally this bypassing is undesirable and unnecessary because the full-flow filter cartridges will, during their normal life, adequately accommodate the oil whether it is cold or warm, dirty or clean. However, sometimes mechanics forget to change filters and the danger is that through such forgetfulness dirty oil may completely clog the filter. Therefore, bypass means may be provided by perforated cup-like valve bodies 47 with spring mounted valves 48 therein mounted in perforations 49 of the plate 40, in direct alignment with and in the cartridge passages 36. When the pressure is excessive inside the casing 30, bypass valves 48 are forced down against spring pressure, and oil can then pass directly into the passages 36 and thence to the outlets 12.

Above and spaced from the closure plate 40 is an annular swirl plate 50, providing a quieting chamber 51 between the plates 40 and 50. The swirl plate 50 is flat and is spaced radially in from the casing 30 and is secured to the ring 31 by a plurality of strip-like brackets 52 that extend radially outwardly and are fastened to the ring 30 by screws 53. (The screws 33 and 53 may be the same screws, if desired, or may be different ones, as shown.) The clearance 54 thereby provided between the plate 50 and the casing 30 helps heavy particles (which are flung out by the centrifugal force of the swirling oil above the plate 50) to fall down into the filter. The inner periphery 55 of the plate 50 is preferably stamped or spun down to provide a rounded edge for eliminating undesirable turbulence at the opening 56, through which the oil settles from the vortex above into the quieting chamber 51.

Above and spaced from the swirl plate 50 to provide a disc-shaped vortex chamber 57 therebetween, is an annular baffle 60, which may be substantially flat or preferably has a slight slope, as shown, from its outer periphery 61 to its inner periphery 62, so that any oil that gets above the baffle 60 will run down the slop and fall down through a central opening 63. In this invention, the opening 63 is smaller than the opening 56. The outer periphery 61 is defined by a down-turned flange 64 that fits into the wall 23 with a sliding fit. The purpose is to provide a very narrow and relatively long clearance through which air can rise and oil can fall back down.

The two plates 50 and 60 provide between them the generally disc-shaped chamber 57, which, it will be noted, is the vortex portion into which the inlet 11 conducts the foaming dirty oil at high velocity (e.g., 65 gallons per minute). In this disc-shaped chamber 57, a substantially doughnut-shaped section of foamed oil and air is continually whirled around, separating the oil from the air by forcing the oil out toward the periphery of the whirling mass. The de-aerated oil is ejected into the chamber 51 below the swirl plate 50, while the air passes upwardly in the vortex of the whirling mass through the opening 63 into a chamber 65 above the baffle 60.

A cap 70 closes the upper end of this lubricant system 10 and provides the upper end of the chamber 65. The cap 70 extends over the upper end of the housing member 20, covering the upper end of the passage 26. It is secured in place to the housing 20 by a Marmon clamp 71, 72 providing a leak-tight fit but also quickly releasable. The cap 70 supports, for removal with it, the baffle 60, by means of a series of brackets 73.

Thus, the cap 70 with its plate 60 are easily removed by first loosening the Marmon clamp 72 and then sliding it up away from the housing 20. When that is done, the swirl plate 50, the cartridges 35, and their plates 40 and 34 are all removable with the casing 30 as a unit from the housing 20 by simply taking out the few screws 33 and then pulling up on the plate 50, once the parts thereabove have been removed. Thus, it is easy to replace the filter cartridges 35 and they may easily be inspected and replaced if they are in good condition; the ease of doing so encourages mechanics to make frequent inspections. When a mechanic has taken the casing 30 out, all he has to do to replace the cartridges 35 is to remove the swirl plate 50, disconnect the upper end of the springs 44 from the latch opening 46, remove the plate 40, take out the old filter cartridges 35, slip in the new ones, and put the plates 40 and 50 back on. Or the mechanic may have a complete new filter unit (including the casing 30 and all contained parts) ready to install and simply slip it into place. In either event, the operation is simple and encourages good maintenance practice rather than discouraging it.

To aid in getting a smooth vortex, a rib 75 is provided on the radially inner side of the inlet 11, along the entrance side only. The oil therefore flows over or around the end of this rib 75 into the vortex chamber 57.

In operation, the foamy oil enters the housing 20 through the inlet 11 over or around the rib 75 and is introduced in a centrifugal whirling path into the disc-shaped air-oil-separating or vortex chamber 57. There the material whirls around in a flat, dough-nut-like vortex between the plates 50 and 60. During operation, the scavenger pump in the engine does not return oil at a uniform flow rate or of a uniform air content. Sometimes there is much more air than at other times, and the oil level in the device 10 rises and falls constantly, but the restricted vents 28 and the filter elements 35 combine to balance an increase in oil level with an increase in pressure and an increase in pressure with an increase in flow through the filter, so as to tend to maintain a desired oil level regardless of the flow rates of air and oil or their relative flows. The heavier parts of the mixture are forced radially outwardly and the lighter parts radially inwardly. The heaviest portions drop through the clearance 54, while most of the oil drops by virtue of its gravity through the larger lower opening 56. The air partly rises and partly is squeezed in toward the center of the vortex and then flows upwardly through the upper opening 63 into the pressure chamber 65. The air flows from the chamber 65 through the restricted vents 28, passages 26 and 27, chamber 25, and outlet 14 into the air space 15 above the oil inside the tank 13. The restricted air-outlet vents 28 keep a back pressure of air within the chamber 65 acting at all times to force the oil downwardly and through the cartridges 35.

As the oil goes down through the opening 56, it becomes quieter in the chamber 51, so that it is less turbulent when it enters through the perforations 41 into the passages 39 and comes into contact with the outer surfaces 38 of the cartridges 35. The air pressure built up in the chamber 65 helps to force the oil to pass through the cartridges 35 into the passages 36 and out the outlets 12 at the bottom into the oil tank 13. Thus a separation of air and oil is carried on in direct conjunction with the filtering operation, the air helping the filtering by providing the pressure needed for it, while the air at the same time is being separated from the oil so that entrained air and foam will not interfere with the filtering and other operations.

A modified form of lubricant purifying system 100 embodying many of the features of the unit 10 already described and having some important differences is shown in FIGS. 7 through 10. Among the many similarities is the use of a disc-shaped vortex chamber. The unit 100 receives foamed dirty oil at an inlet 101 and discharges clean oil from the bottom through a vertical outlet 102 into an oil tank 103, below the oil level therein. The system 100 also discharges air that is separated from the oil in the disc-like vortex chamber, sending it out air outlets 104 into an air space 105 in the tank 103. The tank 103, like the tank 13, is normally vented to the atmosphere, though the vents are not shown.

Figure 8:
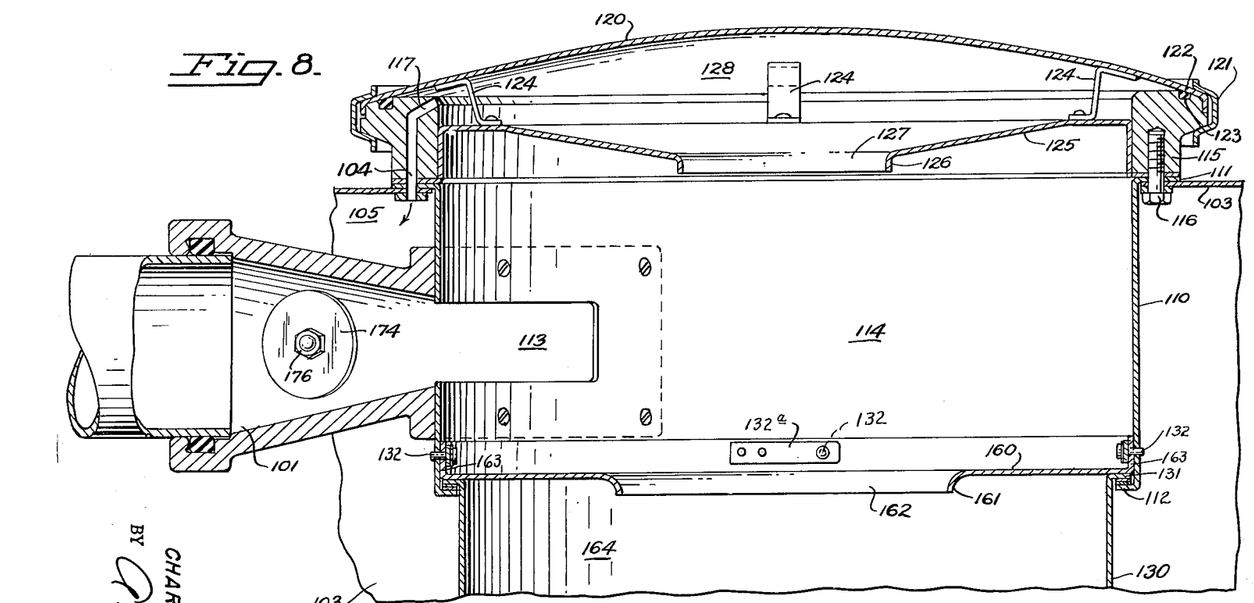
FIG. 8 is an enlarged fragmentary view in elevation and in section of the upper portion of FIG. 7.
Figure 9:
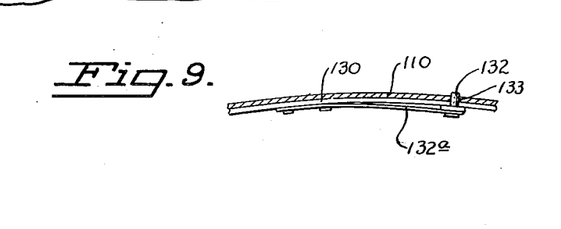
FIG. 9 is a fragmentary view on the scale of FIG. 8 of one of the bayonet pins.

The unit 100 includes a generally cylindrical, open-end, upper housing member 110 with an upper radially outwardly extending flange 111 and a lower radially inwardly extending flange 112. The inlet 101 leads through an opening 113 into a disc-shaped vortex chamber 114 provided in conjunction with baffles which will be mentioned later but comprising substantially the full height of the cylindrical upper housing 110. The upper flange 111 is secured between the wall of the tank 103 and a ring 115 by suitable fastening members, such as bolts 116 threaded into the ring 115. The ring 115 is preferably a short and simply formed casting as shown in FIG. 8, and its structure makes it possible for the housing member 110 to be a lightweight unit fabricated from sheet metal. The bolts 116 are spaced at even intervals around the ring 115 and alternate with the similarly located air conduits 104, which terminate at their upper end in a sloping drilled opening 117. The orifices or conduits 104 and 117 are of carefully controlled size to prevent passage of oil therethrough and to build up a back pressure of air that aids in forcing oil through the filter cartridge.

The upper end of the ring 115 is closed by a cap 120 which is fastened to the ring by a Marmon clamp 121 or by other suitable means. A rubber gasket 122 of suitable oil-resistant elastomer may be provided between the cap 120 and ring 115 to close them in a leak-tight fit, the gasket 122 fitting into a recess 123 in the ring 115. Brackets 124 depend from the cap 120 and support the upper baffle 125 which, like the baffle 60, slopes in toward the center and is provided with a down-turned flange 126, defining an opening 127 at the upper end of the vortex chamber 114. Thus air passes up from the vortex chamber 114 into an air-pressure chamber 128 above the baffle 125 and thence via the limited-size orifices 117 and 104 into the tank 103, the orifices being too small to pass oil and serving to build up filtering back pressure.

The casing 30 of the embodiment of FIGS. 1–6 is here replaced by a casing 130 having an upper flange 131 fitting over or above the lower flange 112 of the housing 110 and held there by a swirl plate ring 160 having pins 132 mounted on a spring 132ª to engage openings 133 in the housing 110. The member 110 and the member 130 may be released by first taking out the ring 160 and then lifting out the casing 130. The casing 130 terminates its lower end in an outlet portion 134 tapering in toward the center and forming the outlet opening 102. Permanently secured just above the bottom portion 134, as by tack welding, is a bottom closure plate 135 having outlet openings 136 adapted to align with the through central openings 137 of sets of filter cartridges 140. These outlet openings 136 may be provided with suitable upwardly projecting means such as short tubes 141 for retaining the cartridges 140 accurately in position. The plate 135 may easily be formed in this structure from lightweight sheet metal. Thus the entire lower closure plate or plug may be formed from sheet metal by proper punching and forming with tubes 141 projecting upwardly to align the filter cartridges 140 and an outer peripheral flange 142 extending downwardly and fitting snugly against the side walls 130 to which it is tack welded, riveted, or otherwise secured.

The lower closure plate 135 also is formed to provide a series of brackets 143 that receive the lower ends of springs 144 which, as in the former embodiment, are held in tension between the lower closure plate 135 and an upper closure plate 145 where the spring is anchored to a bracket 146. The filter cartridges 140 are thus held tightly clamped in columns between the plates 135 and 145 with the cartridges in each column held snugly together. As before, openings 147 through and a peripheral clearance 148 around the upper closure plate 145 lead from above the plate 145 into the space between the filter cartridges 140, so that oil can pass radially through the cartridges 140 into the openings 137.

Preferably, there is in addition a handle member 150 with a downwardly extending rod 151 whose lower end is threadably attached, as by a nut 152, to the lower closure plate 135, while a flange 153 near its upper end bears against the upper closure plate 145. This means that it is possible to remove the entire unit 130 and all its contents by releasing the bayonet pins 132 from their holes 133 and removing the plate 160, then pulling up on the handle 150, once access to it has been obtained by removal of the cap 120.

It is to be understood that the lower baffle or swirl plate 160 may be formed from sheet metal with a downwardly extending flange 161 surrounding an opening 162 and with an upwardly extending outer peripheral flange 163 which supports the spring 132ª and in operation is secured to the housing 110 by the pins 132. This baffle 160 divides the vortex chamber 114 from a filtering and settling oil chamber 164 below it.

Figure 10:
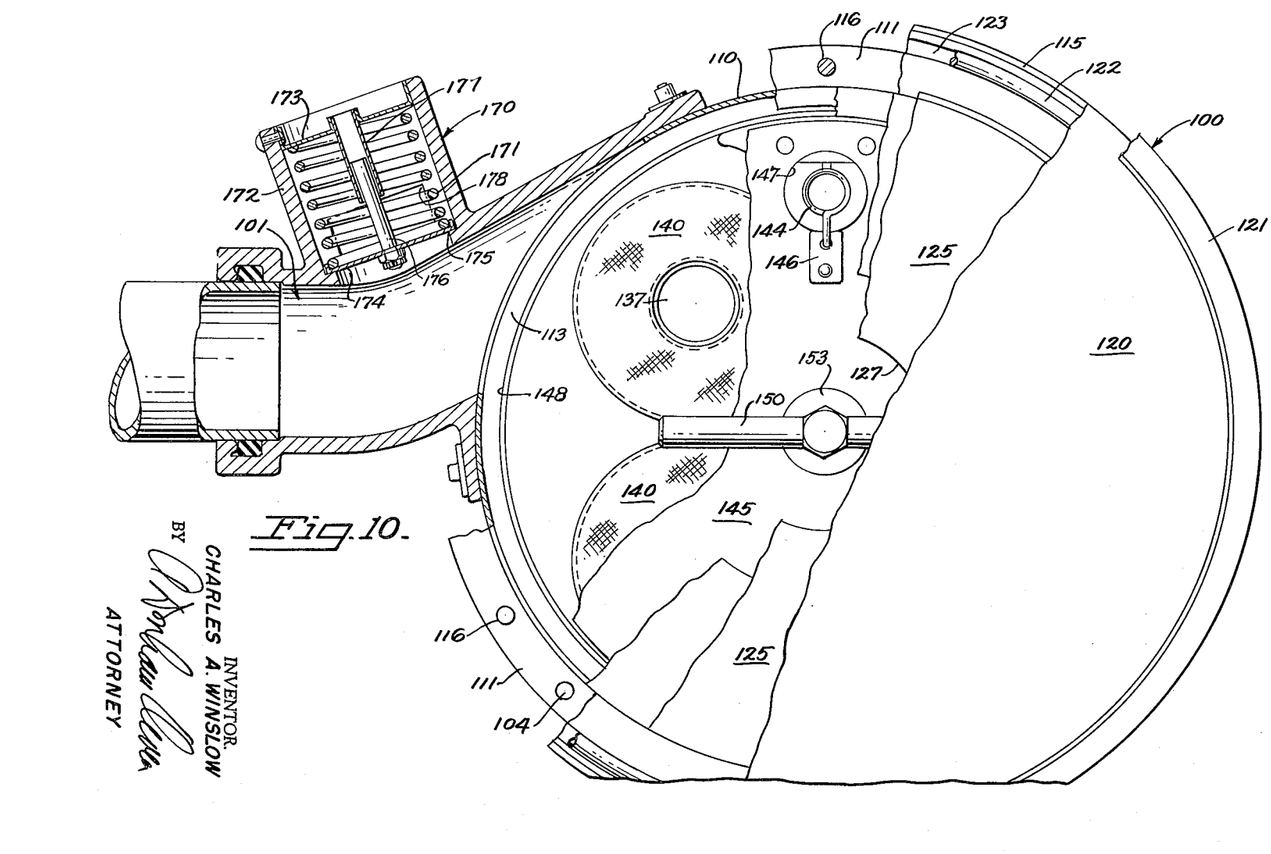
FIG. 10 is an enlarged top plan view of FIG. 7 with portions successively broken away and shown in section.

A novel feature of the unit 100 is its provision of a bypass valve 170 at the inlet 101, more clearly shown in FIG. 10. The valve 170 may have a spring 171 located between a bearing plate 172 that is secured to a housing 173 and a valve closure plate 174 that normally holds the closure plate 174 against a seat 175. A stem 176 secured to the plate 174 moves in a guide sleeve 177 that is part of the bearing plate 172, to keep the parts in alignment. When the pressure in the unit 100 becomes excessive, the pressure builds up also in the vortex chamber 114 and in the inlet 101 and therefore forces the bypass valve 170 open, sending oil directly into the tank 103 through plural ports 178, where it is available for use to the engine. This means that this particular oil has likewise not been filtered and de-foamed; so that the presence of foamed oil gives evidence that the filter has been plugged with sludge metal, etc.

In normal operation of the unit 100, oil enters through the inlet 101 into the vortex chamber 114 where it whirls around and where the oil is separated from the foam and air. The oil passes down through the opening 162 into the quieting and distributing space 164 above the upper closure plate 145. It passes through the openings 147 in and the peripheral clearance 148 around the upper closure plate 145 into the spaces between the filter cartridges 140 and passes through the filter cartridges 140 into the interior openings 137 and from there down through the openings 136 in the lower closure plate 135 to the outlet 102. Meanwhile, the air is moved in toward the center of the vortex, whence it rises and passes out the restricted openings 117 and 104 into the air space 105 above the oil level in the tank 103. The openings 117 being restricted provide the necessary pressure for forcing the oil through the filters 140 and maintain the proper flow level.

When it is desired to check the state of the filter cartridges 140 or to replace the element, the Marmon clamp 121 is loosened and the cap 120 removed, and then the entire casing 130 with the cartridges 140 and the lower baffle plate 160 and all the contents can be lifted out by turning and then lifting the handle 150. Once this assembly is out, the nut 152 can be taken off, the springs 144 detached, and the cartridges 140 taken out and replaced, or an entire new unit may be put into place, if desired. Re-installation is just as simple. In operation such as starting with cold oil, it may be possible to force some small globules of air down with the filtered oil. Therefore, a series of vent holes can be provided as indicated at 177 to allow air escape up to the space 105 above the oil rather than force it along with the filtered de-aerated oil to the engine bearings through outlet 102.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim.

1. A combination lubricant defoaming and full-flow filtering device, comprising: an open-end cylindrical housing having a tangential inlet opening and an outlet; full-flow filter cartridge means interposed in said housing between said inlet and said outlet; a pair of annuli supported by said housing one closely above and one closely below said inlet to provide a disc-shaped vortex chamber free from impedances between said annuli and communicating with said inlet to direct entering aerated foamy lubricant into a flat vortex path between said annuli and to separate gas from aerated lubricant, the gas passing up through the upper annulus and the lubricant down through the lower annulus, said lower annulus being a substantial distance above said filter cartridge means; a cap closing the upper end of said housing and defining a gas pressure chamber above said upper annulus; and gas-restricting vent means in said housing in fluid communication with said gas pressure chamber.

2. The device of claim 1 wherein the outer periphery of said lower annulus is spaced apart from said housing to pass heavy particles flung outwardly in said vortex chamber.

3. The device of claim 1 wherein the opening through the lower annulus is substantially greater than that through the upper annulus.

4. The device of claim 1 wherein said lower annulus and said filter cartridge means are supported by an assembly that is bayonet-mounted in said housing for ready removal therefrom.

5. The device of claim 1 having a bypass pressure-actuated valve on said housing at said inlet, said valve having means urging it to a normally closed position.

6. A combination lubricant defoaming and self-pressure-regulating filter device, comprising: an open-end cylindrical housing having a tangential inlet opening; a cylindrical casing detachably supported by a lower portion of said housing below said inlet and having oil outlet means therefrom; full-flow filter cartridge means interposed in said casing between said inlet and said outlet; a pair of annuli supported horizontally by said housing on opposite vertical sides of said inlet to provide a disc-shaped unimpeded vortex chamber communicating with said inlet and said lower annulus being spaced above said casing to direct entering aerated foamy lubricant into a flat vortex path between said annuli and to separate gas from aerated lubricant, the gas passing up through the upper annulus and the lubricant down through the lower annulus; a cap closing the upper end of said housing and defining a gas pressure chamber above said upper annulus; vent passages in said housing in fluid communication with said gas pressure chamber; and means restricting gas flow through said vent passages to increase pressure within the shell, whereby entering foamy lubricant is normally separated in the vortex chamber into liquid and gas phases with the gas phase blowing out said vent passages and the liquid phase passing through said filter cartridge means, with the restricted gas flow through the vent passages causing an accumulation of gas therein to increase pressure within the device and facilitate the filtering of lubricant through the full-flow filter cartridge means so that de-aeration and filtration of lubricant is had in a unitary operation.

7. A combination lubricant defoaming-and-filter-pressure-regulating separator device comprising: an open-end, vertically disposed, cylindrical housing having a tangential inlet thereinto and gas venting passages leading from adjacent the upper end of said housing; a full-flow filter means supported by said housing and interrupting lubricant flow through it; a closure for the upper end of said housing; a pair of centrally apertured baffle means supported in said housing one below and one above said inlet, leaving an unimpeded chamber between them, the upper baffle means being spaced below said closure and separating said gas venting passages thereabove from said inlet therebelow, whereby gas displaced by centrifugal force from foamy lubricant will pass up through said central aperture in said upper baffle means to said gas venting passages, the central aperture through said lower baffle being larger than the one through said upper baffle, said lower baffle being spaced a substantial distance above said filter means to provide therebetween a quieting portion for de-aerated oil; and means restricting gas flow through said gas venting passages to increase pressure within said device; whereby the restricted flow of gas through the vents causes an accumulation of foam therein which causes pressure to be increased within said device which facilitates the filtration of lubricant through said filter means so that de-aeration and filtration of lubricant is had in a unitary operation.

8. A separator, including in combination a main housing open at each end and having generally vertical side walls, upper and lower radially inwardly extending flanges, and a tangential inlet opening; a filter casing open at each end and having a cylindrical wall with a radially outwardly extending flange at its upper end resting on and detachably secured to said upper flange of said housing below said inlet; filter means inside said casing below said flange a substantial distance; a cap closing the upper end of said housing; an upper annular baffle spaced down from said cap and above said inlet with its outer periphery spaced close to said housing side wall and having an axial opening therein leading into a chamber defined between said cap and said upper baffle, said housing having conduit means with a restricted inlet for conducting gas out through said housing from said chamber; a lower annular baffle spaced down from said upper baffle and supported by said casing below said inlet and above said filter means to provide a generally horizonal disc-like vortex chamber between said baffles and a quieting chamber below said lower baffle, said lower baffle having an axial opening larger than that of said upper baffle; whereby the entering foamy lubricant is whirled about in the housing between said upper and lower baffles causing a vortex, whence gas-free lubricant settles down toward the filter means while gas passes through said upper baffle to the space between said baffle and said cap and through said conduit means, the restricted inlet of said conduit means restricting passage of gas therethrough and causing pressure to build up in the housing and aid in the filtration of said lubricant and in forcing gas out said conduit means, thereby combining filtration and de-gasification in a unitary operation.

9. The separator of claim 8 wherein said filter means comprises a plurality of filter cartridges extending generally vertically and each having an axial conduit therethrough for conducting out lubricant filtered in generally radially from the outside walls of said cartridge; a lower closure plate for said plurality of filter cartridges, closed against said casing cylindrical wall and imperforate except for outlet openings; means for aligning the axial conduit of each cartridge with an outlet opening; an upper closure plate aligning and closing the upper ends of said cartridges and having openings therethrough leading into spaces between said cartridges; and spring means releasably secured in tension between said upper closure plate and said lower closure plate for holding said cartridges removably in place clamped between said plates.

10. The separator of claim 9 wherein said means for aligning and axial conduit of each cartridge with an outlet opening comprises a V-shaped strip tack-welded into and extending up from the walls of said lower plate defining said outlet openings.

11. A separator, including in combination a housing having generally vertical side walls with a tangential inlet opening therethrough, a cap closing the upper end, and an open lower end; a filter assembly inside said housing below said cap and said inlet and above said lower end; an upper annular baffle spaced down from said cap and above said inlet with its outer periphery close to said side walls and having an axial opening therein leading into a chamber between said cap and said upper baffle, said housing having restricted conduit means of small diameter for conducting gas out through said housing from said chamber; a lower annular baffle spaced down from said upper baffle and below said inlet and above said filter assembly to provide a generally horizontal disc-like unimpeded vortex chamber between said baffles, said lower baffle having an axial opening larger than that of said upper baffle, said lower baffle being spaced a substantial distance above said filter assembly and slightly away from said side walls, whereby the entering foamy lubricant is whirled about in the housing between said upper and lower baffles causing a vortex, whence gas-free lubricant settles toward the filter assembly from the outside of said larger axial opening while gas passes in the inner periphery of said upper baffle to the space between said baffle and said cap and through said restricted conduit means, the small diameter of said conduit means restricting passage of gas therethrough and causing pressure to build up in the housing and aid in the filtration of said lubricant and in forcing gas out said restricted conduit means, thereby combining filtration and de-gasification in a unitary operation.

12. A separator, including in combination a main housing open at each end and having generally vertical side walls, upper and lower radially extending ends, and a tangential inlet opening; a filter casing open at each end and having a cylindrical wall with a radially outwardly extending flange at its upper end resting on and detachably secured to said lower end of said housing below said inlet; filter means inside said casing a substantial distance below said flange; a cap closing the upper end of said housing; an upper annular baffle spaced down from said cap and above said inlet with its outer periphery spaced close to said housing side wall and having an axial opening therein leading into a chamber defined between said cap and said upper baffle, said housing having conduit means with a restricted inlet for conducting gas out through said housing from said chamber; a lower annular baffle spaced down from said upper baffle and supported by said housing below said inlet and above said filter means to provide a generally horizontal disc-like vortex chamber between said baffles and a quieting chamber below said lower baffle, said lower baffle having an axial opening larger than that of said upper baffle; whereby the entering foamy lubricant is whirled about in the housing between said upper and lower baffles causing a vortex, whence gas-free lubricant settles down toward the filter means while gas passes through said upper baffle to the space between said baffle and said cap and through said conduit means, the restricted inlet of said conduit means restricting passage of gas therethrough and causing pressure to build up in the housing and aid in the filtration of said lubricant and in forcing gas out said conduit means, thereby combining filtration and degasification in a unitary operation.

13. The separator of claim 12 wherein said filter means comprises a plurality of filter cartridges extending generally vertically and each having an axial conduit therethrough for conducting out lubricant filtered in generally radially from the outside walls of said cartridge; a lower closure plate for said plurality of filter cartridges, closed against said casing cylindrical wall and imperforate except for outlet openings; means for aligning the axial conduit of each cartridge with an outlet opening; an upper closure plate aligning and closing the upper ends of said cartridges and having openings therethrough leading into spaces between said cartridges; and spring means releasably secured in tension between said upper closure plate and said lower closure plate for holding said cartridges removably in place clamped between said plates.

14. The separator of claim 13 wherein said means for aligning the axial conduit of each cartridge with an outlet opening comprises a cylindrical projection extending up from each said outlet opening of said lower plate.

15. A separator, including in combination a housing having generally vertical side walls with a tangential inlet opening therethrough, a cap closing the upper end, and an open lower end; a filter assembly inside said housing below said cap and said inlet and above said lower end; an upper annular baffle spaced down from said cap and above said inlet with its outer periphery close to and spaced from said side walls and having an axial opening therein leading into a chamber between said cap and said upper baffle, said housing having restricted conduit means of small diameter for conducting gas out through said housing from said chamber; a lower annular baffle spaced down from said upper baffle and below said inlet and above said filter assembly to provide a generally horizontal disc-like unimpeded vortex chamber between said baffles, said lower baffle having an axial opening larger than that of said upper baffle, said lower baffle being spaced a substantial distance above said filter assembly whereby the entering foamy lubricant is whirled about in the housing between said upper and lower baffles causing a vortex, whence gas-free lubricant settles toward the filter assembly from the outside of said larger axial opening while gas passes in the inner periphery of said upper baffle to the space between said baffle and said cap and through said restricted conduit means, the small diameter of said conduit means restricting passage of gas therethrough and causing pressure to build up in the housing and aid in the filtration of said lubricant and in forcing gas out said restricted conduit means, thereby combining filtration and de-gasification in a unitary operation.

16. A separator, including in combination a housing having generally vertical side walls with a tangential inlet opening therethrough, a cap closing the upper end, and an open lower end; a filter assembly inside said housing below said cap and said inlet and above said lower end, said filter assembly comprising a plurality of filter cartridges extending generally vertically and each having an axial conduit therethrough for conducting out lubricant filtered in generally radially from the outside walls of said cartridge, a lower closure plate for said plurality of filter cartridges, imperforate except for openings aligned with said conduits, said plate being sealed against said side walls so that the lubricant from above can pass therethrough only via said conduits, an upper closure plate aligning and closing the upper ends of said cartridges and having openings therethrough extending into the spaces between said cartridges, and spring means in tension between said closure plates for holding said filter assembly removably in place clamped between said plates; an upper annular baffle spaced down from said cap and above said inlet with its outer periphery close to said side walls and having an axial opening therein leading into a chamber between said cap and said upper baffle, said housing having restricted conduit means of small diameter for conducting gas out through said housing from said chamber; a lower annular baffle spaced down from said upper baffle and below said inlet and above said filter assembly to provide a generally horizontal disc-like vortex chamber between said baffles, said lower baffle having an axial opening larger than that of said upper baffle, said lower baffle being spaced above said filter assembly and slightly away from said side walls, whereby the entering foamy lubricant is whirled about in the housing between said upper and lower baffles causing a vortex, whence gas-free lubricant settles toward the filter assembly from the outside of said larger axial opening while gas passes in the inner periphery of said upper baffle to the space between said baffle and said cap and through said restricted conduit means, the small diameter of said conduit means restricting passage of gas therethrough and causing pressure to build up on the housing and aid in the filtration of said lubricant and in forcing gas out said restricted conduit means, thereby combining filtration and de-gasification in a unitary operation.

17. A separator, including in combination a housing having generally vertical side walls with a tangential inlet opening therethrough, a cap closing the upper end, and an open lower end; a filter assembly inside said housing below said cap and said inlet and above said lower end, said filter assembly comprising a plurality of filter cartridges extending generally vertically and each having an axial conduit therethrough for conducting out lubricant filtered in generally radially from the outside walls of said cartridge, a lower closure plate for said plurality of filter cartridges, imperforate except for openings aligned with said conduits, said plate being sealed against said side walls so that the lubricant from above can pass therethrough only via said conduits, an upper closure plate aligning and closing the upper ends of said cartridges and having openings therethrough extending into the spaces between said cartridges, and spring means in tension between said closure plates for holding said filter assembly removably in place clamped between said plates; an upper annular baffle spaced down from said cap and above said inlet with its outer periphery close to said side walls and having an axial opening therein leading into a chamber between said cap and said upper baffle, said housing having restricted conduit means of small diameter for conducting gas through said housing from said chamber; a lower annular baffle spaced down from said upper baffle and below said inlet and above said filter assembly to provide a generally horizontal disc-like vortex chamber between said baffles, said lower baffle having an axial opening larger than that of said upper baffle, said lower baffle being spaced above said filter assembly whereby the entering foamy lubricant is whirled about in the housing between said upper and lower baffles causing a vortex, whence gas-free lubricant settles toward the filter assembly from the outside of said larger axial opening while gas passes in the inner periphery of said upper baffle to the space between said baffle and said cap and through said restricted conduit means, the small diameter of said conduit means restricting passage of gas therethrough and causing pressure to build up in the housing and aid in the filtration of said lubricant and in forcing gas out said restricted conduit means, thereby combining filtration and de-gasification in a unitary operation.

References Cited in the file of this patent
UNITED STATES PATENTS

| | | |
|---|---|---|
| 2,286,254 | Brault | June 16, 1942 |
| 2,681,643 | Winslow | June 22, 1954 |
| 2,811,218 | Winslow | Oct. 29, 1957 |
| 2,811,220 | Winslow | Oct. 29, 1957 |